(12) United States Patent
Varughese et al.

(10) Patent No.: US 11,654,863 B2
(45) Date of Patent: May 23, 2023

(54) VEHICLE CONTROL AND IDENTIFICATION SYSTEMS AND METHODS

(71) Applicant: DENSO International America, Inc., Southfield, MI (US)

(72) Inventors: Sibu Varughese, Sterling Heights, MI (US); Martin Nespolo, Grosse Pointe Woods, MI (US); Gareth Webb, New Hudson, MI (US); Thomas Krzyzak, Livonia, MI (US); Wilson Yim, Troy, MI (US); Matthew Johnson, Royal Oak, MI (US)

(73) Assignee: DENSO International America, Inc., Southfield, MI (US)

( * ) Notice: Subject to any disclaimer, the term of this patent is extended or adjusted under 35 U.S.C. 154(b) by 391 days.

(21) Appl. No.: 16/943,018

(22) Filed: Jul. 30, 2020

(65) Prior Publication Data
US 2022/0032873 A1 Feb. 3, 2022

(51) Int. Cl.
*B60R 25/24* (2013.01)
*G06F 16/901* (2019.01)
*B60R 25/04* (2013.01)
*B60R 25/30* (2013.01)

(52) U.S. Cl.
CPC ............ *B60R 25/24* (2013.01); *B60R 25/04* (2013.01); *B60R 25/305* (2013.01); *G06F 16/901* (2019.01); *B60R 2325/101* (2013.01); *B60R 2325/103* (2013.01); *B60R 2325/205* (2013.01)

(58) Field of Classification Search
CPC ....... B60R 25/24; B60R 25/04; B60R 25/305; B60R 2325/101; B60R 2325/103; B60R 2325/205; G06F 16/901
See application file for complete search history.

(56) References Cited

U.S. PATENT DOCUMENTS

| 9,688,247 | B1 * | 6/2017 | Jayaraman | ............... H04L 9/32 |
| 9,794,753 | B1 | 10/2017 | Stitt et al. | |
| 9,894,492 | B1 | 2/2018 | Elangovan et al. | |
| 10,002,479 | B2 * | 6/2018 | Oz | ......................... G01S 19/42 |
| 10,244,476 | B2 | 3/2019 | Elangovan et al. | |
| 10,328,898 | B2 | 6/2019 | Golsch et al. | |

(Continued)

FOREIGN PATENT DOCUMENTS

| BR | 102014017465 A2 | 2/2016 |
| CN | 104574593 A | 4/2015 |

(Continued)

*Primary Examiner* — Thomas D Alunkal
(74) *Attorney, Agent, or Firm* — Harness, Dickey & Pierce, P.L.C.

(57) ABSTRACT

An identification system for a property includes: a mobile device including a display and configured to: selectively output a feature during execution of an application; and transmit user data stored on the mobile device; a scanning module configured to scan the feature and to generate an output based on the feature; an identity module configured to, based on the user data, determine an identity identifier indicative of an identity of a user of the mobile device; and a checking module configured to one of approve and deny an action based on: the output generated based on the feature; and the identity identifier indicative of the identity of the user of the mobile device.

20 Claims, 6 Drawing Sheets

(56) References Cited

U.S. PATENT DOCUMENTS

| | | | |
|---|---|---|---|
| 10,328,899 B2 * | 6/2019 | Golsch | G01S 13/876 |
| 10,328,900 B1 * | 6/2019 | Yakovenko | B60R 25/24 |
| 2010/0082491 A1 * | 4/2010 | Rosenblatt | G06Q 20/10 |
| | | | 705/13 |
| 2011/0215921 A1 | 9/2011 | Ben Ayed et al. | |
| 2012/0045058 A1 | 2/2012 | Weghaus | |
| 2012/0078667 A1 * | 3/2012 | Denker | G06Q 10/02 |
| | | | 705/5 |
| 2014/0274013 A1 | 9/2014 | Santavicca | |
| 2015/0081346 A1 * | 3/2015 | Charles | G06Q 10/02 |
| | | | 705/5 |
| 2015/0148989 A1 | 5/2015 | Cooper et al. | |
| 2015/0161832 A1 | 6/2015 | Esselink et al. | |
| 2015/0310681 A1 | 10/2015 | Avery et al. | |
| 2015/0356797 A1 | 12/2015 | McBride et al. | |
| 2016/0150407 A1 | 5/2016 | Michaud et al. | |
| 2017/0062938 A1 | 3/2017 | Cheng et al. | |
| 2017/0104589 A1 | 4/2017 | Lambert et al. | |
| 2017/0132533 A1 | 5/2017 | Darnell et al. | |
| 2017/0309098 A1 | 10/2017 | Watters et al. | |
| 2017/0330402 A1 | 11/2017 | Menard et al. | |
| 2018/0029560 A1 | 2/2018 | Mohaupt et al. | |
| 2018/0099643 A1 | 4/2018 | Golsch et al. | |
| 2018/0103414 A1 | 4/2018 | Golsch | |
| 2018/0126952 A1 | 5/2018 | Niemiec | |
| 2018/0154865 A1 | 6/2018 | Bianchi, III et al. | |
| 2018/0269565 A1 | 9/2018 | Guthrie et al. | |
| 2021/0286864 A1 * | 9/2021 | Burke | G06F 21/32 |

FOREIGN PATENT DOCUMENTS

| | | |
|---|---|---|
| WO | WO-16156682 A1 | 10/2016 |
| WO | WO-2017181050 A1 | 10/2017 |
| WO | WO-18040641 A1 | 3/2018 |

* cited by examiner

VEHICLE CONTROL AND IDENTIFICATION SYSTEMS AND METHODS

FIELD

The present disclosure relates to mobile devices, such as mobile devices configured to interact with vehicles and ordering systems of properties.

BACKGROUND

This section provides background information related to the present disclosure which is not necessarily prior art.

Passive entry/passive start (PEPS) systems allow a vehicle to locate a key associated with the vehicle, such as a wireless key fob carried by a user of the vehicle. PEPS systems can allow anyone in possession of a key fob that has been previously paired with a vehicle's central PEPS electronic control module (ECM) to access the vehicle by grabbing a door handle and to start the vehicle with a push of a button.

The central PEPS ECM authenticates the key fob to determine if the key fob is authorized to access the vehicle (e.g., previously paired with the central PEPs ECM). The central PEPS ECM uses a signal strength determined using a plurality of vehicle antennas to estimate a location of the key fob. If the key fob can be authenticated and is located within a predetermined area, the vehicle's function is made available to the user, such as the vehicle doors are unlocked and/or the vehicle is started.

Accurately confirming an identity of an individual with a mobile device (e.g., a cellular phone) may be valuable, such as in the example of using a mobile device to access a vehicle or using a mobile device as a ticket for entry.

SUMMARY

This section provides a general summary of the disclosure, and is not a comprehensive disclosure of its full scope or all of its features.

In a feature, an identification system for a property includes: a mobile device including a display and configured to: selectively output a feature during execution of an application; and transmit user data stored on the mobile device; a scanning module configured to scan the feature and to generate an output based on the feature; an identity module configured to, based on the user data, determine an identity identifier indicative of an identity of a user of the mobile device; and a checking module configured to one of approve and deny an action based on: the output generated based on the feature; and the identity identifier indicative of the identity of the user of the mobile device.

In further features, the mobile device is configured to optically display the feature on the display as part of an electronic ticket for an event at the property.

In further features, the user data includes at least three different types of user data.

In further features, the user data includes at least three of: a serial number of the mobile device; a user account associated with an application on the mobile device; cookies stored on the mobile device; a cellular service provider of the mobile device; a home address stored on the mobile device; a work address stored on the mobile device; and a name stored on the mobile device.

In further features, the user data includes a user account including an email address.

In further features, the identity module is configured to determine the identity identifier indicative of the identity of the user of the mobile device using a database including a plurality of identity identifiers and associated sets of stored user data.

In further features, the identity module is configured to select the identity identifier indicative of the identity of the user of the mobile device from the plurality of identity identifiers based on the stored user data associated with the identity identifier more closely matching the user data received from the mobile device than the other sets of stored user data.

In further features, the checking module is configured to selectively approve the action when the output of the feature is included in a database including a plurality of features.

In further features, the checking module is configured to selectively approve the action when the identity identifier is not included in a database including a plurality of identity identifiers.

In further features: the user data includes a serial number of the mobile device; and the checking module is configured to selectively approve the action when the serial number of the mobile device is not included in a database including a plurality of serial numbers of mobile devices.

In further features: the user data includes a serial number of the mobile device; and the checking module is configured to approve the action on the display when all of: the serial number of the mobile device is not included in a first database including a plurality of serial numbers of mobile devices; the output of the feature is included in a second database including a plurality of features; and the identity identifier is not included in a database including a plurality of identity identifiers.

In further features, the checking module is configured to deny the action when the output of the feature is not included in a database including a plurality of features.

In further features, the checking module is configured to deny the action when the identity identifier is included in a database including a plurality of identity identifiers.

In further features: the user data includes a serial number of the mobile device; and the checking module is configured to deny the action when the serial number of the mobile device is included in a database including a plurality of serial numbers of mobile devices.

In further features, a vehicle system includes: the identification system; and a vehicle configured to: wirelessly connect to the mobile device; and selectively at least one of: unlock one or more doors of the vehicle; and start the vehicle.

In further features, the feature is a quick response (QR) code.

In further features, the action is allowing entry into the property.

In further features, the action is complete an electronic transaction.

In further features, the scanning module includes at least one of a camera, an infrared scanner, a near field communication (NFC) transceiver, and a Bluetooth low energy (BLE) transceiver.

In an identification method includes: by a mobile device including a display, selectively output a feature during execution of an application; and by the mobile device, transmit user data stored on the mobile device, where the user data includes at least three different types of user data; receiving the feature from the mobile device; generating an output based on the feature; based on the user data, determining an identity identifier indicative of an identity of a user of the mobile device; and one of approve and deny an action based on: the output generated based on the feature; and the identity identifier indicative of the identity of the user of the mobile device.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Mobile devices can be used to perform various functions, such as perform internet searches, check email, send messages, etc. Examples of mobile devices include, but are not limited to, such as (smart) cellular phones and tablet devices. Mobile devices can also be used to perform other functions, such as to store electronic tickets used to enter a property (e.g., a stadium, an event venue, etc.) to experience an event (e.g., a speech, a concert, a sporting event, etc.), execute a transaction for goods and/or services, etc.

Obtaining user data is important to property operators. Knowing the identity of the user of a ticket is also important to property operators. Since tickets can be transferred and re-sold, an operator of the property may have no way of knowing who the actual user of a ticket is. For example, when one mobile device is used to store tickets for multiple attendees, an identifier of one attendee (e.g., associated with an account holder of the tickets) may be known. However, the operator may have no way of knowing the identities of the other attendees. If one of the other attendees is later expelled from the property, the operator would not have a way to later deny that attendee from re-entering with another ticket and/or another mobile device. This concept can also be applied elsewhere, such as the purchase of alcoholic beverages, etc.

The present application involves aggregate user data from a mobile device to determine an identity of a user of the mobile device. Examples of user data include, for example, cellular provider, device serial number, registered names stored on the mobile device, cookies store on the mobile device, marketing pixels stored on the mobile device, stored accounts (e.g., cloud, calendar, email, etc.), and other data. The user data can be used to determine an identity of a user of the mobile device. The identity of the user may be used, for example, to verify whether the user is authorized to enter the property, verify that the user is not on a list of individuals that are not to be sold alcohol, etc.

Figure 1:
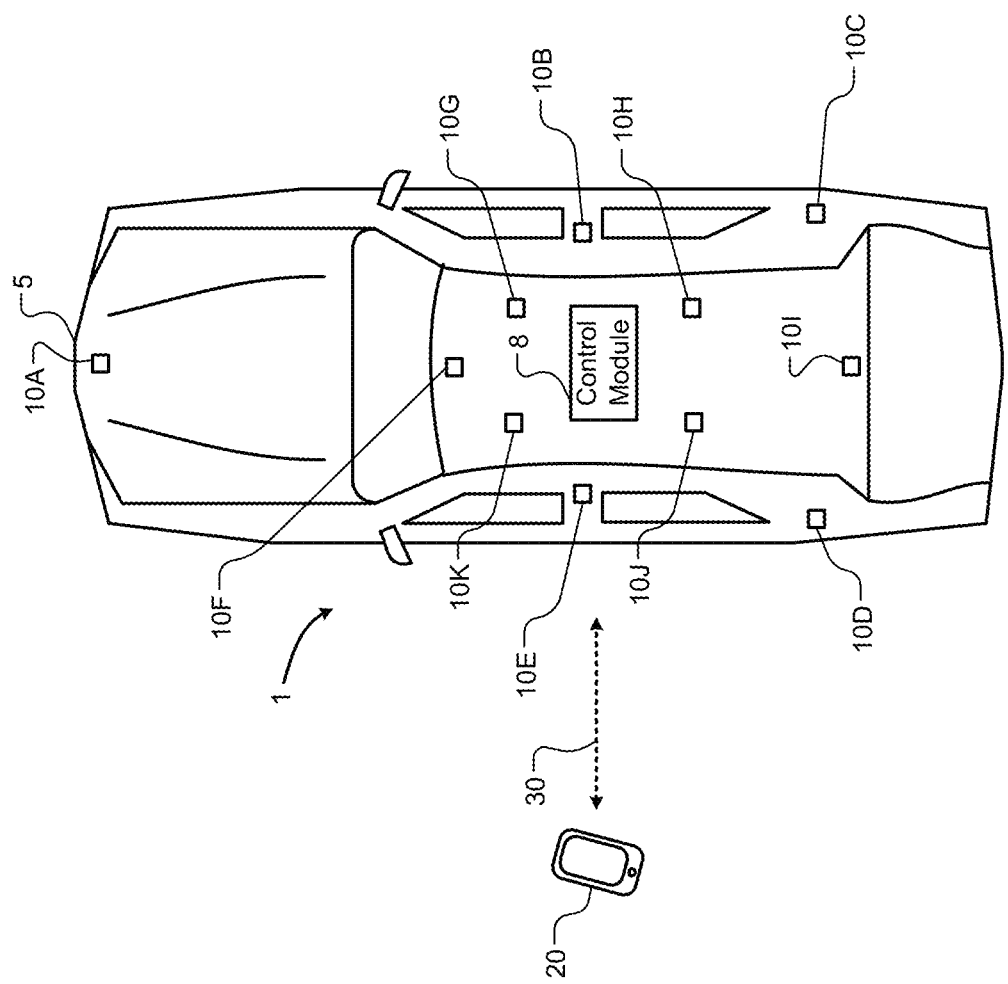
FIG. 1 is a functional block diagram of a subject vehicle with a localization system.
Figure 2:
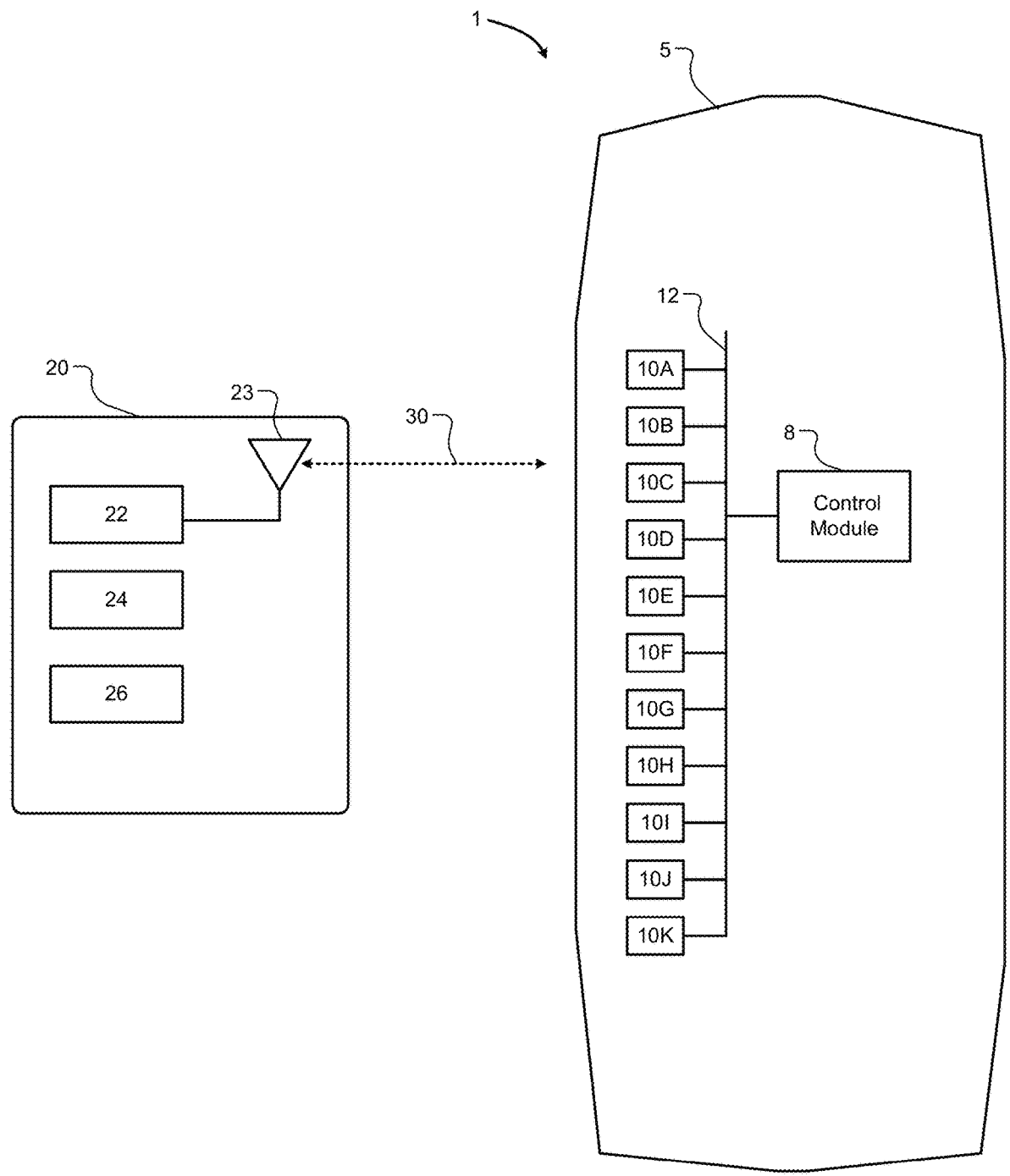
FIG. 2 is a functional block diagram including example components of a portable device.

With reference to FIGS. 1 and 2, a localization system 1 is provided within a vehicle 5 and includes a control module 8 (also referred to as a central communication module) and a plurality of sensors 10A to 10K (collectively referred to as sensors 10). The sensors 10 can include a number of sensors that are mounted on or to the exterior of the vehicle 5, such as exterior body or trim components of the vehicle 5. In the example of FIG. 1, sensors 10A to 10E are shown as exterior sensors. The sensors 10 can additionally or alternatively include a number of sensors that are mounted on or to the interior of the vehicle 5, such as interior trim components of the vehicle 5. In the example of FIG. 1, sensors 1OF to 10K are shown as interior sensors. For example only, the sensors 10 may include antennas or antenna modules.

The control module 8 can be implemented, for example, as a PEPS electronic control module (ECM) and is described in further detail below. The control module 8 can communicate with the sensors 10 using a wired vehicle interface 12, such as in the example of FIG. 2. The vehicle interface 12, for example, can include a controller area network (CAN) bus and/or a lower data rate communication bus, such as a local interconnect network (LIN) bus. The vehicle interface 12 can also include a clock extension peripheral interface (CXPI) bus. Additionally or alternatively, the vehicle interface 12 can include a combination of CAN bus, LIN bus, and CXPI bus communication interfaces. Additionally or alternatively, the control module 8 can communicate with the sensors 10 using wireless communication.

The control module 8 is configured to establish a secure communication connection, such as a Bluetooth low energy (BLE) communication connection, for example, with a portable device 20. As noted above, the control module 8 communicates information about the secure communication connection to the sensors 10 via the vehicle interface 12, such as the timing of the next communication connection event, the timing interval between communication connection events, the communication channel for the next communication connection event, a channel map, a channel hop interval or offset to calculate the channel for subsequent communication connection events, communication latency information, and/or communication jitter information, etc. The sensors 10 can then follow the secure communication connection between the control module 8 and the portable device 20 and receive communication packets sent by the portable device 20 to the control module 8. The sensors 10 can then measure signal information about the signals received from the portable device, such as relative signal strength (RSSI), angle of arrival, time of arrival, time difference of arrival, etc., and communicate the signal information to the control module 8 via communication over the vehicle interface 12.

With particular reference to FIG. 2, the portable device 20 can include one or more communication chipsets, such as communication chipset 22. For example, the portable device 20 may include one or more of a BLE chipset, a WiFi chipset, a WiFi direct chipset, and one or more other types of chipsets connected to one or more antennas, such as antenna 23. The portable device 20 can also include application software stored in memory 24. The portable device 20 can also optionally include a global positioning system (GPS) module 26 or another suitable type of location device.

The portable device 20 sends and receives communication signals 30 to and from the control module 8. As discussed above, the sensors 10 can listen for the communication signals 30 based on the information about the secure communication connection received from the control module 8. As such, the sensors 10 also receive the communication signals 30 sent by the portable device 20 to the control module 8. The portable device 20 can also be referred to as a mobile device.

Examples of the portable device 20 include cellular (smart) phones, tablet devices, and other types of devices with re-chargeable internal batteries that allow for device operation without the device being connected to power. In addition to being used to interact with the vehicle 10, the portable device 20 can also be used to perform one or more other operations/functions. Additionally, the portable device 20 can place pay for items electronically (e.g., using Apple-Pay, GooglePay, Venmo, etc.) with vendors selling various different types of items, such as food, beverages, merchandise, etc. Additionally, the portable device 20 can be used to present electronic tickets that can be used to gain entry to a property (e.g., a stadium, concert venue, etc.).

Different functions may be performed using different applications, such as application 210, executed by the portable device 20. For example, the portable device 20 may display one or more electronic tickets for an event during execution of an application. The portable device 20 may be used to pay for one or more items during execution of an application. While the examples of displaying electronic tickets and payment are provided, the present application is also applicable to other functions.

Figure 3:
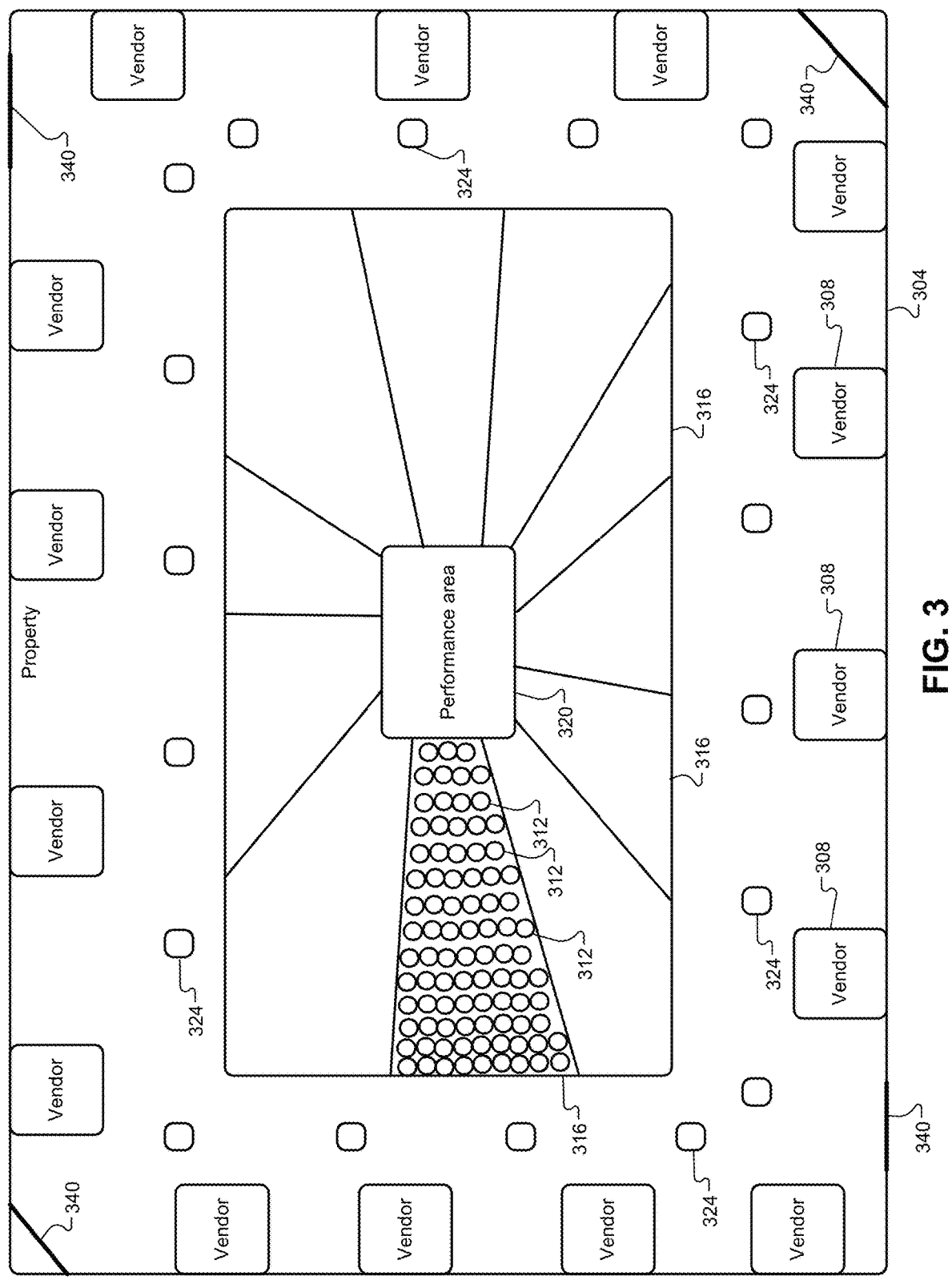
FIG. 3 is a top view of an example property.

FIG. 3 is a top view of an example property 304, such as a stadium, an event center, a concert venue, etc. One or more vendors 308 are located at the property 304. The vendors 308 sell items, such as food items, beverage items, merchandise items (e.g., clothing, keychains, bumper stickers, etc.), and other types of concession items.

The property 304 also includes a plurality of seats 312. The seats 312 may be arranged in more than one section 316 in various properties. While seats are only shown in one section for simplicity, each section may include seats. The seats 312 may be numbered and may be arranged in rows. As such, each of the seats 312 may have a unique section, row, and seat number. The section, row, and seat number of an attendee may be specified on a ticket of the attendee. The tickets used to gain entry to the property 304 may be electronic, paper, or a combination of paper and electronic tickets. Electronic tickets may be stored by portable devices or access, such as using an application executed by the portable devices.

The property 304 may include a performance area 320, such as a field for playing one or more sports, a place for one or more stages, etc. An event which attendees may travel to the property 304 to experience (and for which the ticket may be issued) may be performed on the performance area 320. While an example property arrangement of seats, sections, vendors, and performance area are provided, the present application is also applicable to other property arrangements.

A plurality of location modules 324 may be located throughout the property 304. The location modules 324 may be, for example, Bluetooth low energy (BLE) beacon modules or another suitable type of transceiver. WiFi and ZigBee are examples of other types of transceivers. The location modules 324 are used to determine locations of portable devices within the property 304. The location modules 324 may also be used to communicate other data and/or with devices.

The location modules 324 may transmit (e.g., broadcast) a predetermined signal having predetermined characteristics periodically (e.g., twice per second or at another suitable frequency). Each of the location modules 324 may also transmit a unique identifier (ID) of that location module 324 with the predetermined signal.

The portable device 20 determines the RSSI based on one or more characteristics (e.g., magnitude) of the predetermined signal received from a location module 324. The RSSI corresponds to a radial distance of the portable device 20 from that location module 324. For example, the RSSI may decrease as the distance between the portable device 20 and the location module 324 increases, and vice versa. The RSSIs determined based on the predetermined signals received from multiple location modules 324 and the locations of those location modules 324 may be used to determine a location of the portable device 20. The location modules 324 may be located throughout the property 304 such that any portable device that is within boundaries of the property 304 will receive the predetermined signals from at least two, three, or more than three different location modules. This may allow for triangulation of the location of all portable devices that are within the boundaries of the property 304.

Portable devices 20 may transmit the IDs of the location modules 324 from which the predetermined signals were received within the last predetermined period and the RSSIs determined based on those predetermined signals. These IDs and RSSIs may be used to determine the locations of the portable devices.

Figure 4:
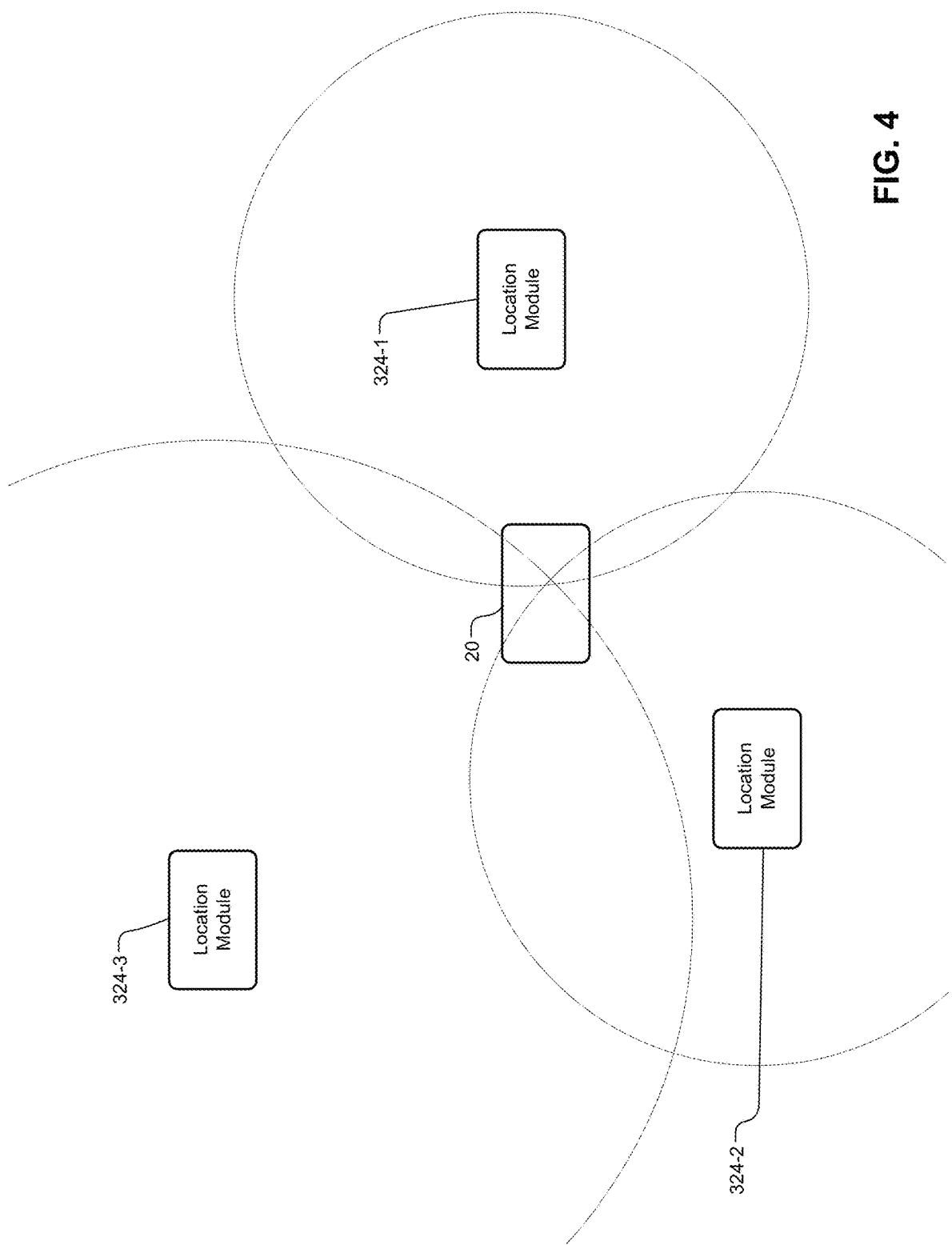
FIG. 4 is an example block diagram including location modules and a portable device.

FIG. 4 is an example block diagram including location modules 324-1, 324-2, 324-3, and a portable device 20. Based on the RSSI determined based on the predetermined signal received from the location module 324-1, a location determination module at the property 304 may determine that the portable device 20 is a first distance (corresponding to a first radius of a circle) from the location module 324-1. Based on the RSSI determined based on the predetermined signal received from the location module 324-2, the location determination module may determine that the portable device 20 is a second distance (corresponding to a second radius of a circle) from the location module 324-2. Based on the RSSI determined based on the predetermined signal received from the location module 324-3, the location determination module may determine that the portable device 20 is a third distance (corresponding to a third radius of a circle) from the location module 324-3. The location determination module may determine that the location where the circles intersect is approximately the location of the portable device 20.

Referring back to FIG. 3, the property 304 may include one or more gates 340 through which attendees enter the property 304 for an event after presentation of a valid ticket for the event. While the example of gates is provided, another suitable type of opening may be used. Tickets of attendees may be checked at the gates 340 using checking devices before attendees are allowed through the gates 340 and onto the property 304. Checking devices may also be used at vendors, for example, for electronic transactions with portable devices 20.

Figure 5:
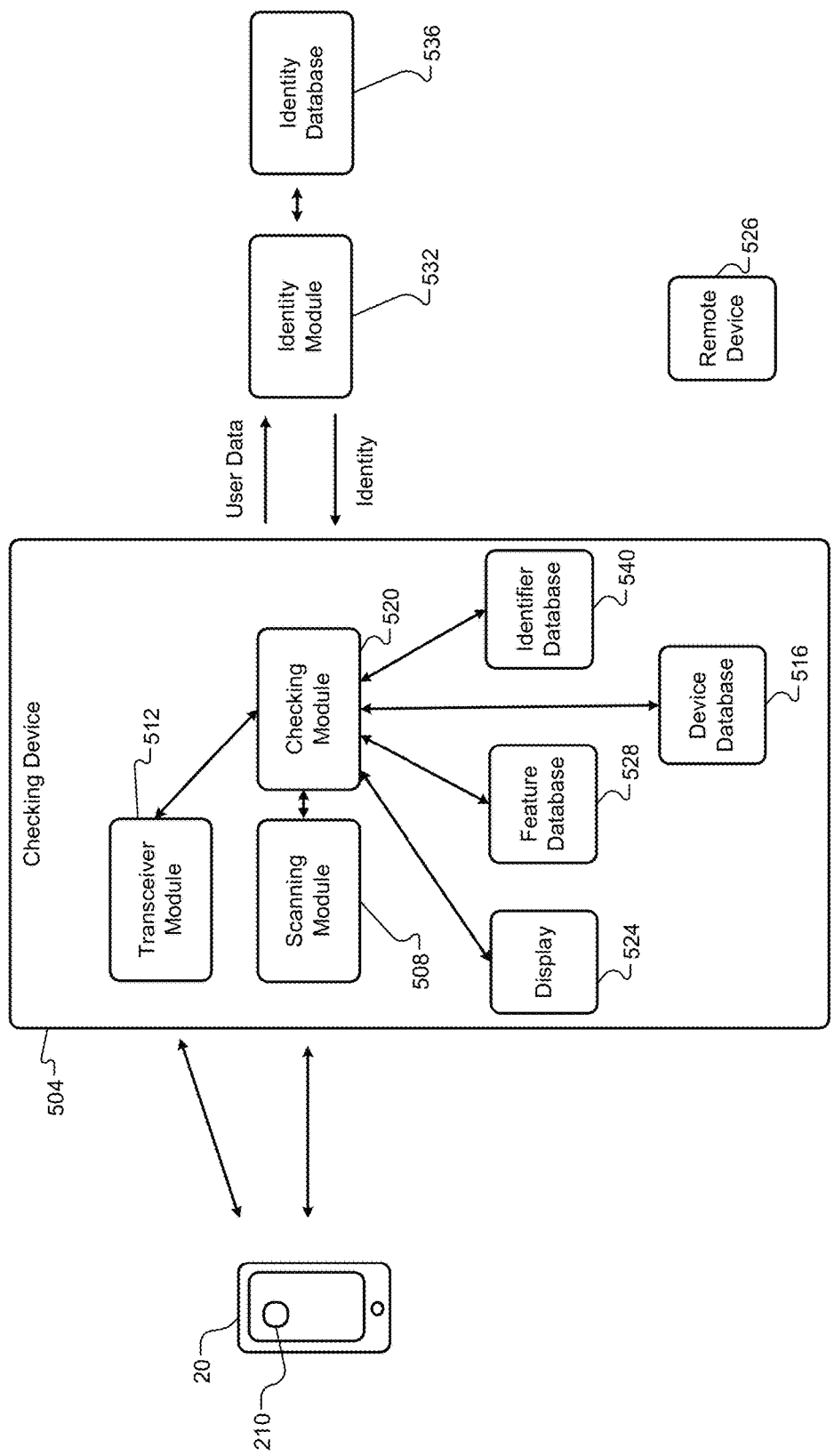
FIG. 5 is a functional block diagram of an example identification system.

FIG. 5 is a functional block diagram of an example identification system. The mobile device 20 includes various user data stored in memory of the mobile device. Examples of the user data include, but are not limited to, a serial number (SN) of the mobile device 20, one or more user accounts (e.g., email addresses) associated with one or more applications (e.g., email, calendar, cloud storage, social media, etc.) executed by the mobile device 20, cookies, advertising pixels regarding targeted advertisements for the mobile device 20, a cellular service provider of the mobile device 20, one or more registered names, a home location, a work location, one or more other mobile devices that are (e.g., commonly) present near the mobile device 20, etc. Which one or more other mobile devices are present near a mobile device may be determined, for example, based on location information from the location modules 324 or in another suitable manner.

The mobile device 20 communicates with a checking device 504 at the property 304. For example, the mobile device 20 may communicate with the checking device 504 to verify validity of an electronic ticket (for entry to the property 304) displayed by the mobile device 20, to conduct an electronic transaction for one or more items with a vendor at the property 304, etc.

The checking device 504 may include a scanning module 508 configured to interact with the mobile device 20. The scanning module 508 may include, for example, an optical scanner (e.g., including a camera, an infrared sensor, etc.) configured to scan optical features displayed on mobile devices, such as quick response (QR) codes, barcodes, etc. The scanning module 508 scans an optical feature displayed on the mobile device 20 and generates an output based on the scanned feature. The mobile device 20 may display the optical feature, for example, on an electronic ticket or to conduct an electronic (mobile) transaction.

In various implementations, the scanning module 508 may include a non-optical scanner. For example, the scanning module 508 may include a near field communication (NFC) transceiver configured to obtain data for electronic tickets from mobile devices or a Bluetooth (e.g., Bluetooth low energy (BLE) transceiver configured to obtain data for electronic tickets from mobile devices. Non-optically obtaining the data for electronic tickets may allow for smoother and faster entrance to the property for authorized ticketholders.

A transceiver module 512 selectively transmits a request for user data stored in the mobile device 20, such as in response to the scanning of the optical feature. The mobile device 20 transmits the user data to the checking device 504 in response to the request. The transceiver module 512 may communicate with the mobile device 20 wirelessly via a WiFi (e.g., IEEE 802.11 based) connection, a Bluetooth (e.g., IEEE 802.15 based) connection, or another suitable type of communication. The user data includes at least three different pieces (types) of user data and may include at least four different pieces of user data.

The checking device 504 may include a device database 516 that includes a list of unique identifiers of mobile devices, such as serial numbers of mobile devices, that are to be denied entry to the property 304 or denied to complete an electronic transaction (e.g., generally or for one or more specific types of items, such as alcoholic beverages). A checking module 520 may determine whether the unique identifier of the mobile device 20 is included in the device database 516. If so, the checking module 520 may display on one or more displays, such as display 524 indicative of a denial. The denial may be, for example, to deny entry to the property 304 in the example of the mobile device 20 displaying an optical feature of an electronic ticket or a denial of completion of the transaction in the example of the optical feature being for an electronic transaction.

Based on the denial, a user of the checking device 504 at a gate may not authorize the user of the mobile device 20 to enter the property 304. Additionally or alternatively, a barrier (e.g., an electronic turnstile or gate) may lock and present a physical barrier to prevent the user from entering the property 304. The device database 516 may be updated by one or more remote devices 526 (e.g., wirelessly), such as when a user is expelled or barred from the property 304.

The checking device 504 may also include a (optical) feature database 528 that includes outputs of the scanning module 508 that are authorized, such as corresponding to optical features of authorized electronic tickets. The checking module 520 may determine whether the output of the scanning module 508 is included in the feature database 528. If not, the checking module 520 may display on one or more displays, such as the display 524 indicative of a denial. The denial may be, for example, to deny entry to the property 304.

Based on the denial, a user of the checking device 504 at a gate may not authorize the user of the mobile device 20 to enter the property 304. Additionally or alternatively, a barrier (e.g., an electronic turnstile or gate) may lock and present a physical barrier to prevent the user from entering the property 304. The feature database 528 may be updated by one or more remote devices 526 (e.g., wirelessly), such as when electronic tickets are issued for an event at the property 304.

If the unique identifier of the mobile device 20 is not in the device database 516, the checking module 520 transmits the user data to an identity module 532. The identity module 532 determines an identity of the user (e.g., owner) of the mobile device 20 based on the user data. Studies have shown that the identity of a user of a mobile device can be determined with over 90 percent accuracy with at least four (4) different pieces of user data. The identity of a user of a mobile device can be determined with at least 70 percent accuracy with at least three (3) different pieces of user data.

The identity module 532 determines the identity of the user of the mobile device 20 using an identity database 536. More specifically, the identity module 532 determines the identity of the user by matching the received user data with user data stored in the identity database 536 in association with an identity.

The identity database 536 includes unique identifiers of identities of users of mobile devices. A set of multiple different types (e.g., at least 3 or 4) of user data are stored in association with each unique identity identifier in the identity database 536. The identity module 532 compares the user data of the mobile device 20 with the sets of stored user data and determines which set of stored user data the user data from the mobile device 20 most closely matches. The identity module 532 may select the unique identity identifier associated with the set of stored user data that most closely matches the user data from the mobile device 20. The identity module 532 transmits the selected unique identity identifier to the checking device 504.

If matching between the set of stored user data that most closely matches the user data from the mobile device 20 is less than a predetermined value, the identity module 532 may indicate that the identity of the user of the mobile device 20 is unknown. The identity module 532 may also create a new unique identifier in the identity database 536 and store the user data from the mobile device 20 in association with the new unique identifier. This may allow the identity of the user of the mobile device 20 to be identified in the future.

The identity module 532 and the identity database 536 may be located remotely from the property 304. The checking module 520 may communicate with the identity module 532 via a network, such as the Internet.

The checking device 504 may include an identifier database 540 that includes a list of unique identity identifiers (e.g., values) indicative of users (of mobile devices) that are to be denied entry to the property 304 or denied completion an electronic transaction (e.g., generally or for one or more specific types of items, such as alcoholic beverages). The checking module 520 may determine whether the unique identity identifier received from the identity module 532 is included in the identifier database 540. If so, the checking module 520 may display on one or more displays, such as display 524 indicative of a denial. The denial may be, for example, to deny entry to the property 304 in the example of the mobile device 20 displaying an optical feature of an electronic ticket or a denial of completion of the transaction in the example of the optical feature being for an electronic transaction.

Based on the denial, a user of the checking device 504 at a gate may not authorize the user of the mobile device 20 to enter the property 304. Additionally or alternatively, a barrier (e.g., an electronic turnstile or gate) may lock and present a physical barrier to prevent the user from entering the property 304. The identifier database 540 may be updated by one or more remote devices 526 (e.g., wirelessly), such as when a user is expelled or barred from the property 304.

If the unique identity identifier is not included on the identifier database 540, the user of the mobile device 20 may be allowed entry to the property 304 in the example of electronic ticketing. In the example of a mobile transaction, the checking module 520 may continue toward completion of an electronic transfer or debit of funds from an account to the vendor and transfer possession of the one or more items to the user.

Figure 6:
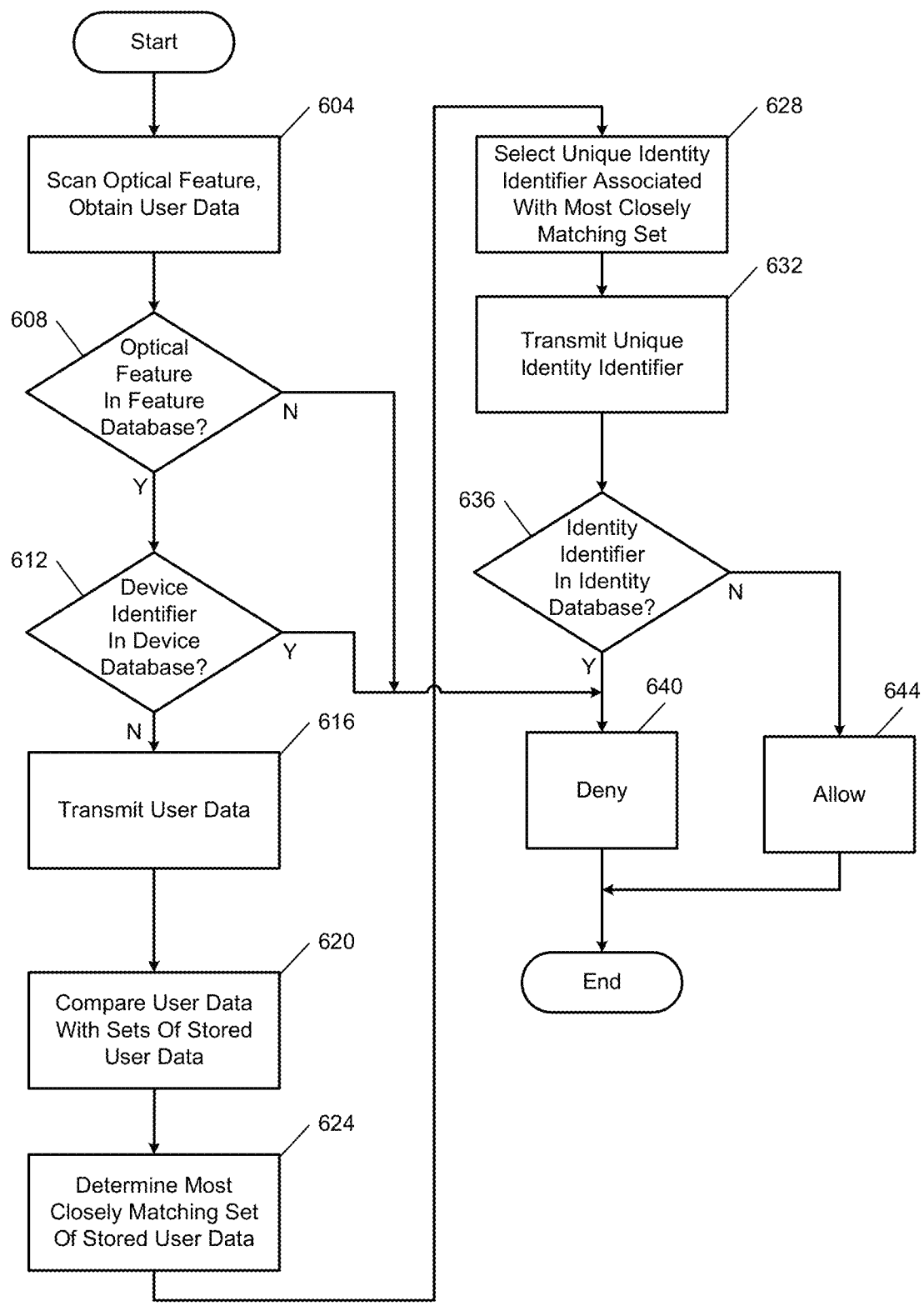
FIG. 6 is a flowchart depicting an example method of determining an identity of a user of a mobile device and approving or denying an exchange, such as an electronic transaction or an opportunity to enter a property using an electronic ticket.

FIG. 6 is a flowchart depicting an example method of determining an identity of a user of a mobile device and approving or denying an exchange, such as an electronic transaction or an opportunity to enter a property using an electronic ticket. Control begins with 604 where the scanning module 508 scans an optical feature (e.g., a QR code) displayed on a display of the mobile device 20. The transceiver module 512 may also receive the user data from the mobile device 20 at 604. The user data may include at least 3 or at least 4 different pieces (e.g., types) of user data.

At 608, the checking module 520 determines whether the output of the scanning module 508 (e.g., a value corresponding to the optical feature) is included in the feature database 528. If 608 is false, the checking module 520 displays a denial on the display 524 at 640, and control ends. At 640, the user of the mobile device 20 may be denied entry to the property in the example of an electronic ticket or denied the opportunity to complete an electronic transaction for taking possession of one or more items from a vendor. If 608 is true, control may continue with 612.

At 612, the checking module 520 determines whether the unique device identifier (included in the user data) is included in the device database 516. If 612 is true, control continues with 640, where the checking module 520 displays a denial on the display 524. The user of the mobile device 20 may be denied entry to the property in the example of an electronic ticket or denied the opportunity to complete an electronic transaction for taking possession of one or more items from a vendor. If 612 is false, control may continue with 616.

At 616, the checking module 520 transmits the user data received from the mobile device 20, such as via one or more networks. At 620, the identity module compares the user data received from the mobile device 20 with the stored user data associated with unique identity identifiers in the identity database 536. At 624, the identity module 532 determines the set of the stored user data that most closely matches the user data received from the mobile device 20. At 628, the identity module 532 selects the unique identity identifier that is associated in the identity database 536 with the set of the stored user data that most closely matches the user data received from the mobile device 20.

At 632, the identity module 532 transmits the selected identity identifier to the checking device 504, such as via one or more networks. At 636, the checking module 520 determines whether the selected identity identifier is in the identifier database 540. If 636 is true, control continues with 640, where the checking module 520 displays a denial on the display 524. The user of the mobile device 20 may be denied entry to the property in the example of an electronic ticket or denied the opportunity to complete an electronic transaction for taking possession of one or more items from a vendor. If 636 is false, the checking module 520 may continue with the exchange at 644. For example, the checking module 520 may display a notification on the display 524 to allow the user to enter the property 304 in the example of electronic ticketing. The checking module 520 may also remove the output of the scanning module 508 (corresponding to the optical feature displayed by the mobile device 20) from the feature database 528. This prevents re-use of the same electronic ticket. In the example of mobile payment, the checking module 520 may process a payment for the order.

In a feature, an identification system for a property includes: a mobile device including a display and configured to: selectively output a feature during execution of an application; and transmit user data stored on the mobile device; a scanning module configured to scan the feature and to generate an output based on the feature; an identity module configured to, based on the user data, determine an identity identifier indicative of an identity of a user of the mobile device; and a checking module configured to one of approve and deny an action based on: the output generated based on the feature; and the identity identifier indicative of the identity of the user of the mobile device.

In further features, the mobile device is configured to optically display the feature on the display as part of an electronic ticket for an event at the property.

In further features, the user data includes at least three different types of user data.

In further features, the user data includes at least three of: a serial number of the mobile device; a user account associated with an application on the mobile device; cookies stored on the mobile device; a cellular service provider of the mobile device; a home address stored on the mobile device; a work address stored on the mobile device; and a name stored on the mobile device.

In further features, the user data includes a user account including an email address.

In further features, the identity module is configured to determine the identity identifier indicative of the identity of the user of the mobile device using a database including a plurality of identity identifiers and associated sets of stored user data.

In further features, the identity module is configured to select the identity identifier indicative of the identity of the user of the mobile device from the plurality of identity identifiers based on the stored user data associated with the identity identifier more closely matching the user data received from the mobile device than the other sets of stored user data.

In further features, the checking module is configured to selectively approve the action when the output of the feature is included in a database including a plurality of features.

In further features, the checking module is configured to selectively approve the action when the identity identifier is not included in a database including a plurality of identity identifiers.

In further features: the user data includes a serial number of the mobile device; and the checking module is configured to selectively approve the action when the serial number of the mobile device is not included in a database including a plurality of serial numbers of mobile devices.

In further features: the user data includes a serial number of the mobile device; and the checking module is configured to approve the action on the display when all of: the serial number of the mobile device is not included in a first database including a plurality of serial numbers of mobile devices; the output of the feature is included in a second database including a plurality of features; and the identity identifier is not included in a database including a plurality of identity identifiers.

In further features, the checking module is configured to deny the action when the output of the feature is not included in a database including a plurality of features.

In further features, the checking module is configured to deny the action when the identity identifier is included in a database including a plurality of identity identifiers.

In further features: the user data includes a serial number of the mobile device; and the checking module is configured to deny the action when the serial number of the mobile device is included in a database including a plurality of serial numbers of mobile devices.

In further features, a vehicle system includes: the identification system; and a vehicle configured to: wirelessly connect to the mobile device; and selectively at least one of: unlock one or more doors of the vehicle; and start the vehicle.

In further features, the feature is a quick response (QR) code.

In further features, the action is allowing entry into the property.

In further features, the action is complete an electronic transaction.

In further features, the scanning module includes at least one of a camera, an infrared scanner, a near field communication (NFC) transceiver, and a Bluetooth low energy (BLE) transceiver.

In an identification method includes: by a mobile device including a display, selectively output a feature during execution of an application; and by the mobile device, transmit user data stored on the mobile device, where the user data includes at least three different types of user data; receiving the feature from the mobile device; generating an output based on the feature; based on the user data, determining an identity identifier indicative of an identity of a user of the mobile device; and one of approve and deny an action based on: the output generated based on the feature; and the identity identifier indicative of the identity of the user of the mobile device.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

In this application, including the definitions below, the terms "module" and "system" may refer to, be part of, or include circuits or circuitry that may include processor hardware (shared, dedicated, or group) that executes code and memory hardware (shared, dedicated, or group) that stores code executed by the processor hardware. The code is configured to provide the features of the modules and systems described herein. In addition, in this application the terms "module" and "system" may be replaced with the term "circuit." The term "memory hardware" may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as JavaScript Object Notation (JSON), hypertext markup language (HTML) or extensible markup language (XML); (ii) assembly code; (iii) object code generated from source code by a compiler; (iv) source code for execution by an interpreter; (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An identification system for a property, comprising:
 a mobile device including a display and configured to:
  selectively output a feature during execution of an application; and
  transmit user data stored on the mobile device;
 a scanning module configured to scan the feature and to generate an output based on the feature;
 an identity module configured to, based on the user data, determine an identity identifier indicative of an identity of a user of the mobile device; and
 a checking module configured to one of approve and deny an action based on:
  the output generated based on the feature; and
  the identity identifier indicative of the identity of the user of the mobile device,
 wherein:
  the user data includes a serial number of the mobile device; and
  the checking module is configured to selectively approve the action when the serial number of the mobile device is not included in a database including a plurality of serial numbers of mobile devices.

2. The identification system of claim 1 wherein the mobile device is configured to optically display the feature on the display as part of an electronic ticket for an event at the property.

3. The identification system of claim 1 wherein the user data includes at least three different types of user data.

4. The identification system of claim 3 wherein the user data further includes the serial number of the mobile device and at least two of:
 a user account associated with an application on the mobile device;
 cookies stored on the mobile device;
 a cellular service provider of the mobile device;
 a home address stored on the mobile device;
 a work address stored on the mobile device; and
 a name stored on the mobile device.

5. The identification system of claim 1 wherein the user data further includes a user account including an email address.

6. The identification system of claim 1 wherein the identity module is configured to determine the identity identifier indicative of the identity of the user of the mobile device using a database including a plurality of identity identifiers and associated sets of stored user data.

7. The identification system of claim 6 wherein the identity module is configured to select the identity identifier indicative of the identity of the user of the mobile device from the plurality of identity identifiers based on the stored user data associated with the identity identifier more closely matching the user data received from the mobile device than the other sets of stored user data.

8. The identification system of claim 1 wherein the checking module is configured to selectively approve the action when the output of the feature is included in a database including a plurality of features.

9. The identification system of claim 1 wherein the checking module is configured to selectively approve the action when the identity identifier is not included in a database including a plurality of identity identifiers.

10. The identification system of claim 1 wherein:
 the checking module is configured to approve the action on the display when all of:
  the serial number of the mobile device is not included in the including the plurality of serial numbers of mobile devices;
  the output of the feature is included in a second database including a plurality of features; and
  the identity identifier is not included in a third database including a plurality of identity identifiers.

11. The identification system of claim 1 wherein the checking module is configured to deny the action when the output of the feature is not included in a database including a plurality of features.

12. The identification system of claim 1 wherein the checking module is configured to deny the action when the identity identifier is included in a database including a plurality of identity identifiers.

13. A vehicle system comprising:
the identification system of claim 1; and
a vehicle configured to:
wirelessly connect to the mobile device; and
selectively at least one of:
unlock one or more doors of the vehicle; and
start the vehicle.

14. The identification system of claim 1 wherein the feature is a quick response (QR) code.

15. The identification system of claim 1 wherein the action is allowing entry into the property.

16. The identification system of claim 1 wherein the action is complete an electronic transaction.

17. The identification system of claim 1 wherein the scanning module includes at least one of a camera, an infrared scanner, a near field communication (NFC) transceiver, and a Bluetooth low energy (BLE) transceiver.

18. An identification method, comprising:
by a mobile device including a display, selectively output a feature during execution of an application; and
by the mobile device, transmit user data stored on the mobile device,
wherein the user data includes at least three different types of user data;
receiving the feature from the mobile device;
generating an output based on the feature;
based on the user data, determining an identity identifier indicative of an identity of a user of the mobile device; and
one of approve and deny an action based on:
the output generated based on the feature; and
the identity identifier indicative of the identity of the user of the mobile device,
wherein:
the user data includes a serial number of the mobile device; and
the one of approving and denying an action includes selectively approving the action when the serial number of the mobile device is not included in a database including a plurality of serial numbers of mobile devices.

19. An identification system for a property, comprising:
a mobile device including a display and configured to:
selectively output a feature during execution of an application; and
transmit user data stored on the mobile device;
a scanning module configured to scan the feature and to generate an output based on the feature;
an identity module configured to, based on the user data, determine an identity identifier indicative of an identity of a user of the mobile device; and
a checking module configured to one of approve and deny an action based on:
the output generated based on the feature; and
the identity identifier indicative of the identity of the user of the mobile device,
wherein:
the user data includes a serial number of the mobile device; and
the checking module is configured to approve the action on the display when all of:
the serial number of the mobile device is not included in a first database including a plurality of serial numbers of mobile devices;
the output of the feature is included in a second database including a plurality of features; and
the identity identifier is not included in a database including a plurality of identity identifiers.

20. An identification system for a property, comprising:
a mobile device including a display and configured to:
selectively output a feature during execution of an application; and
transmit user data stored on the mobile device;
a scanning module configured to scan the feature and to generate an output based on the feature;
an identity module configured to, based on the user data, determine an identity identifier indicative of an identity of a user of the mobile device; and
a checking module configured to one of approve and deny an action based on:
the output generated based on the feature; and
the identity identifier indicative of the identity of the user of the mobile device,
wherein:
the user data includes a serial number of the mobile device; and
the checking module is configured to deny the action when the serial number of the mobile device is included in a database including a plurality of serial numbers of mobile devices.

* * * * *